(12) United States Patent  (10) Patent No.: US 7,699,351 B2
Heierli et al.  (45) Date of Patent: Apr. 20, 2010

(54) SECURITY DOCUMENT WITH A VOLUME HOLOGRAM FORMING A PARTIAL MOTIF

(75) Inventors: Rene Heierli, Winterthur (CH); Martin Eichenberger, Zollikon (CH)

(73) Assignee: KXO AG, Zug (CH)

( * ) Notice: Subject to any disclaimer, the term of this patent is extended or adjusted under 35 U.S.C. 154(b) by 0 days.

(21) Appl. No.: 11/660,437

(22) PCT Filed: Aug. 27, 2004

(86) PCT No.: PCT/CH2004/000541
§ 371 (c)(1),
(2), (4) Date: Sep. 24, 2007

(87) PCT Pub. No.: WO2006/021102
PCT Pub. Date: Mar. 2, 2006

(65) Prior Publication Data
US 2008/0164690 A1 Jul. 10, 2008

(51) Int. Cl.
*B42D 15/00* (2006.01)
*G03H 1/00* (2006.01)
(52) U.S. Cl. .......................... 283/91; 283/85; 283/105; 283/114; 359/2
(58) Field of Classification Search .................. 283/85, 283/91, 105, 114; 359/2
See application file for complete search history.

(56) References Cited

U.S. PATENT DOCUMENTS

| 4,124,947 | A | * | 11/1978 | Kuhl et al. | 283/91 |
| 4,705,356 | A | * | 11/1987 | Berning et al. | 359/590 |
| 4,856,857 | A | * | 8/1989 | Takeuchi et al. | 359/3 |
| 5,142,383 | A | * | 8/1992 | Mallik | 359/2 |
| 5,310,222 | A | * | 5/1994 | Chatwin et al. | 283/86 |
| 5,648,165 | A | * | 7/1997 | Phillips et al. | 428/346 |
| 5,801,857 | A | * | 9/1998 | Heckenkamp et al. | 359/2 |
| 6,089,614 | A | * | 7/2000 | Howland et al. | 283/91 |
| 6,369,947 | B1 | * | 4/2002 | Staub et al. | 359/574 |
| 2006/0181077 | A1 | * | 8/2006 | Kaule et al. | 283/72 |

FOREIGN PATENT DOCUMENTS

| DE | 39 32 505 A | 4/1991 |
| EP | 0 304 194 A | 2/1989 |
| EP | 1 091 267 A | 4/2001 |
| WO | 02/073250 A | 9/2002 |
| WO | 03/031198 A | 4/2003 |
| WO | 2004/011274 A | 2/2004 |

* cited by examiner

*Primary Examiner*—Dana Ross
*Assistant Examiner*—Kyle Grabowski
(74) *Attorney, Agent, or Firm*—Ladas and Parry LLP

(57) ABSTRACT

A security object has a substrate (1) carrying a first motif (6) and mutually aligned thereto a second motif (7). The first motif (6) is formed by a volume hologram (8) and visible under a given viewing condition only. The second motif (7) can e.g. be a dye, a surface hologram, a perforation or any other non-variable or optically variable device. The first and the second motif (6, 7) combine to form a third motif, e.g. a legible text. The combination of the first motif (6) formed by a volume hologram (8) with the second motif provides an increased level of security.

4 Claims, 3 Drawing Sheets

SECURITY DOCUMENT WITH A VOLUME HOLOGRAM FORMING A PARTIAL MOTIF

TECHNICAL FIELD

The invention relates to an anti-counterfeit security object, i.e. an object that is difficult to counterfeit, with a volume hologram.

BACKGROUND ART

Security objects of this type may e.g. be bank notes, passports, credit cards, identity cards, packages or tags for valuable goods, data carriers, letterheads, etc. Such objects are often equipped with security features with the purpose to make counterfeiting difficult.

Security features based on holograms are widely known. While most of these features are using surface holograms (i.e. surface diffraction gratings having a depth in the order of only one or a few wavelengths), "volume holograms" have also been proposed for such applications, see e.g. EP 1 091 267. Volume holograms have gratings of a depth that is much larger than the wavelength of visible light, e.g. a depth of at least 10 µm, advantageously at least 50 µm. They can have high diffraction efficiencies, generate powerful images and have well-defined diffraction angles and wavelengths.

With the increasing skill of counterfeiters, a further improvement of such security objects is desired. Also, it is desired that the security objects have characteristics that makes them easy to be verified.

DISCLOSURE OF THE INVENTION

Hence, it is a general object of the invention to provide a security object that provides strong anti-counterfeiting protection and/or that is easy to verify.

Now, in order to implement these and still further objects of the invention, a security object according to the independent claims is provided.

Such a security object contains a first visible motif stored in the volume hologram and a second visible motif stored outside the hologram.

A "motif" in this context designates any kind of symbol, pattern, character or similar that is visible to the unaided eye or to machinery.

"Stored outside the hologram" designates any kind of motif that is not encoded in the refractive index or absorption gratings of the volume hologram, such as a print on the substrate, or a non-holographic coloring of the matrix containing the volume hologram.

The first and the second motif are arranged in alignment, i.e. they are mutually aligned in a defined way. For example, an edge or line formed by the first motif may coincide with, be collinear with or be parallel with an edge or line formed by the second motif.

The first motif is visible under a given viewing condition only, as it is typical for motifs stored in a hologram. For example, it may only be visible when viewing the volume hologram from a first given angular range while illuminating the hologram from a second given angular range with light in a given spectral range. Hence, by deviating from the viewing condition, the first motif may partially or completely disappear or may change its shape or color.

When viewing the first motif under the viewing condition, it combines with the second motif to a third motif.

This kind of arrangement not only allows to check the presence of the first motif but also to compare its relation to the second motif, which provides a further parameter for checking a document's authenticity.

In a particularly advantageous embodiment, the second motif is formed at least in part by an optically variable device (OVD), such as a surface hologram, an optically variable pigment (OVP) that changes its color depending on the viewing direction, or microscopic holes, i.e. a feature that looks different under different angles. This combination allows to provide a very distinctive behavior of the motifs that makes them easy to detect. This is in particular true if the second motif becomes at least partially visible under the viewing condition of the first motif or if the second motif becomes at least partially invisible under the viewing condition of the first motif, because (in both cases) the two motifs seem to interact or to "belong together".

BRIEF DESCRIPTION OF THE DRAWINGS

The invention will be better understood and objects other than those set forth above will become apparent when consideration is given to the following detailed description thereof. Such description makes reference to the annexed drawings, wherein.

MODES FOR CARRYING OUT THE INVENTION

Figure 1:
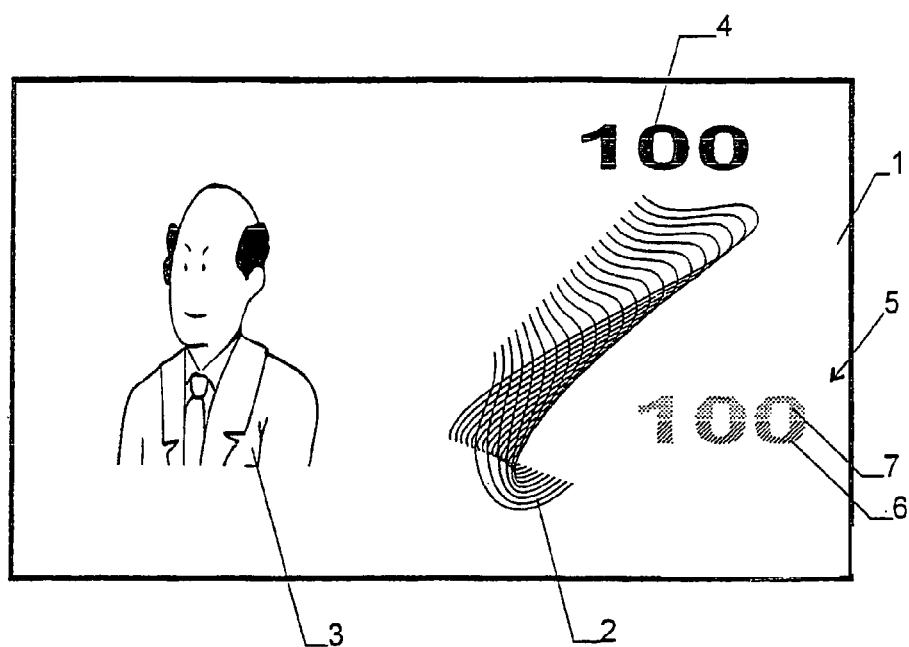
FIG. 1 is a top view of a bank note with a security feature comprising a hologram layer.

FIG. 1 shows, as one embodiment of the security object according to the present invention, a bank note having a substrate 1 of paper or plastics with conventional imprinted or otherwise applied security features 2, images 3 and value information 4. In addition, substrate 1 carries one or more security features 5 comprising a volume hogram.

In the present embodiment, security feature 5 comprises visible motifs. The first motif 6, represented in the figure by a hatched pattern, forms the lower halves of the letters '100', while the second motif 7, represented in the figure by a dotted pattern, forms the upper halves of the letters '100'. The first and the second motif are mutually aligned to form, in combination, the letters '100'.

Figure 2:
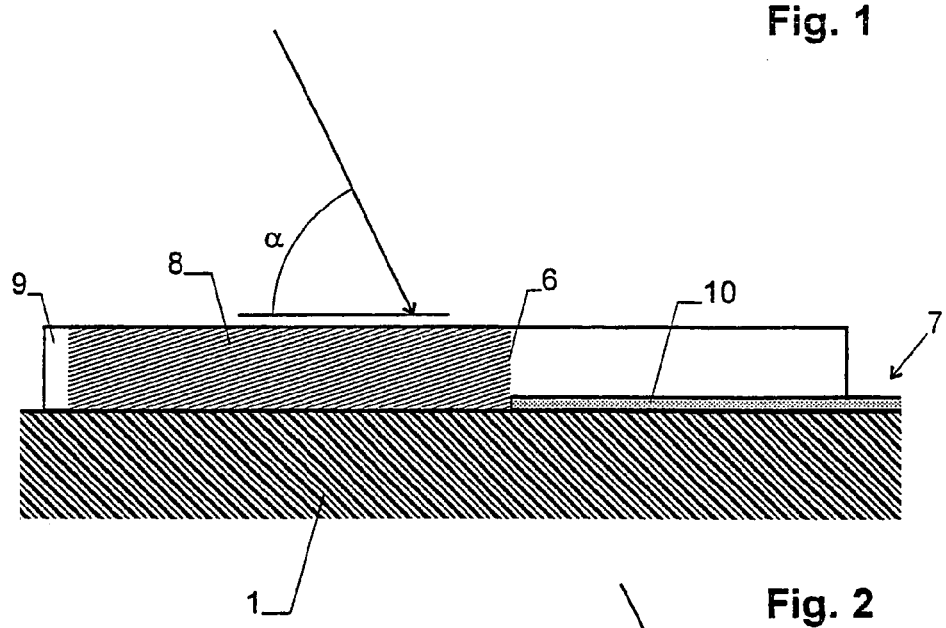
FIG. 2 is a sectional view of the volume hologram and its surroundings in a first embodiment of the invention.

The first motif 6 is formed by the diffraction grating of a volume hologram 8, as it is shown by the embodiment of FIG. 2. The volume hologram is arranged in a matrix 9, such as a transparent or partially transparent polymer. The matrix 9 may also be formed by substrate 1 if the latter is a transparent or partially transparent polymer.

Volume hologram 8 is structured to form the first motif 6, e.g. by cutting the matrix 9 to have the shape of the lower halves of the letters '100' while the volume hologram 8 extends over the whole matrix 9, or limiting the extension of the volume hologram 8 to the shape of the lower halves of the letters '100' while the matrix 9 may have larger size.

Suitable materials and methods for preparing a volume hologram are known to the person skilled in the art and are e.g. described in WO 03/036389 by Xetos AG, Germany.

Typically, the first motif 6 is visible under a certain viewing condition only, because the diffraction condition of the hologram's diffraction grating must be fulfilled. For example, with diffuse white light illumination, the first motif may be visible by eye as a colored image under a viewing angle α between 40° and 100° and be substantially invisible from directions outside that viewing angle.

In the example of FIG. 2, the second motif 7 is formed by a dye or coloring 10 printed on or embedded in substrate 1.

The document of FIGS. 1 and 2 can be examined by viewing it under the viewing condition such that both motifs 6 and 7 are visible and form the easily recognizable number '100'. If no such number appears, or if it appears outside the viewing condition, or if the motifs 6 and 7 are not well aligned, the document may be invalid.

As can be seen from FIG. 2, the matrix 9 may overlap the second motif 7 and, as it will be apparent from subsequent embodiments, the hologram 8 and therefore the first motif 6 may also overlap the second motif 7.

The dye 10 may be a conventional, anisotrodic dye that has the same color from all viewing angles. However, it may advantageously comprise a optically variable pigment (OVP), as it is e.g. described in WO 02/073250. Such an OVP (also called "optically variable ink", OVI) changes color depending on viewing angle. In an advantageous embodiment, volume hologram 7 and dye 10 are chosen such that, under the viewing condition of the volume hologram 8, both motifs have substantially the same color or complementary-colors. This, and the interaction between the first and the second motifs, adds a further security feature to the document.

Figure 3:
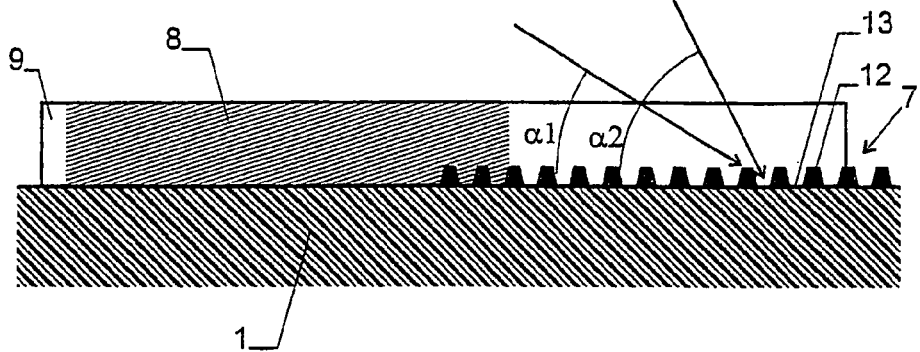
FIG. 3 is a sectional view of the volume hologram and its surroundings in a second embodiment of the invention.

A second embodiment of the invention is shown in FIG. 3. Here, the second motif 7 is formed by a plurality of mounds 12 applied to substrate 1. Valleys 13 are formed between the mounds. When viewed from a first, comparatively flat viewing angle α1, the valleys 13 are hidden by the mounds 12 and therefore substantially invisible, while, when viewed from a second, steeper viewing angle α2, the valleys become visible. The valleys 13 and the mounds 12 have different color, e.g. by using a dye for forming the mounds 12. Hence, the mounds 12 and valleys 13 form an optically variable device that changes its color depending on the viewing angle, as described U.S. Pat. No. 4,124,947.

The volume hologram 8 and the optically variable device 12, 13 of FIG. 3 will interact when the user views the document under different angles, both changing their colors in a characteristic way. By comparing the ways how the two motifs change, the viewer can recognize that they are based on different technologies, which adds a further security feature to the document.

Figure 4:
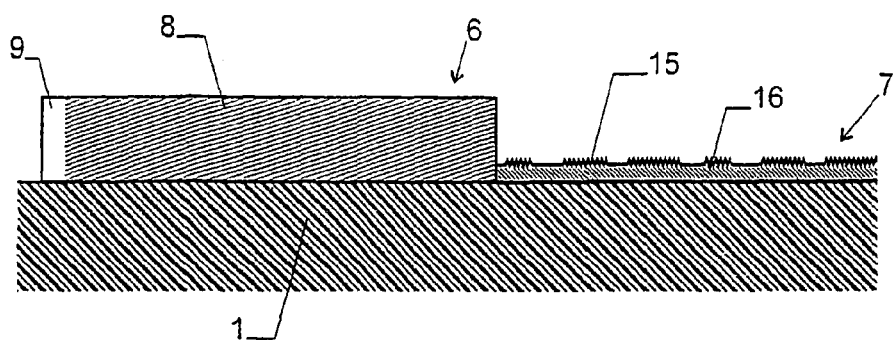
FIG. 4 is a sectional view of the volume hologram and its surroundings in a third embodiment of the invention.

A further embodiment of the invention is disclosed in FIG. 4. Here, the second motif 7 is formed by a surface hologram or, in other words, a surface diffraction grating 15, which is e.g. formed on top of a metal foil 16. Diffraction grating 15 may be covered by a protective, transparent film (not shown), as it is known to the person skilled in the art.

Volume hologram 8 and surface grating 15 of FIG. 4 will again interact when the user views the document under different angles, both changing their colors and/or visible motif in a characteristic way. By comparing the ways how the two motifs change, the viewer can recognize that they are based on different technologies, which adds a further security feature to the document.

Hologram 8 and surface grating 15 may lie beside each other (as shown in FIG. 4), or they may overlap partially or completely.

Figure 5:
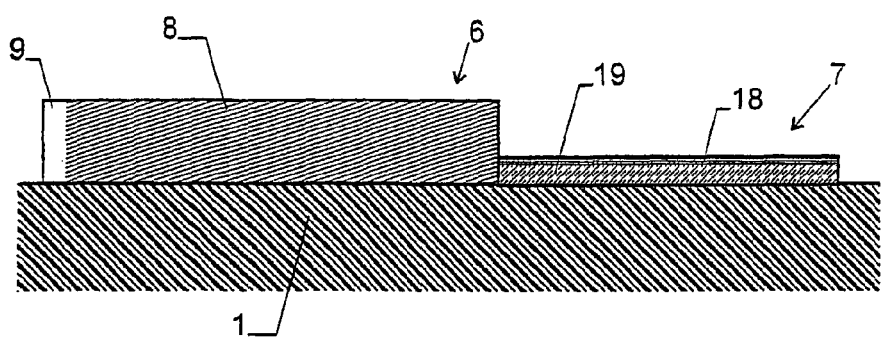
FIG. 5 is a sectional view of the volume hologram and its surroundings in a fourth embodiment of the invention.

FIG. 5 shows another embodiment. In this embodiment, the second motif 7 is generated by a multi-layer coating 18 forming a Fabry-Perot filter on top of a carrier 19. A Fabry-Perot filter is an assembly of one or more thin, partially or fully transparent films forming one or more optical resonators between their interfaces. Such Fabry-Perot filters change their color depending on the viewing angle, similar to optically variable pigments.

The Fabry-Perot filter 18 is structured, e.g. by being cut in the shape of half-letters, to form the second motif 7.

Again, the comparison of the optical properties of the two motifs 6, 7 of the embodiment of FIG. 5 provides a further security aspect of the bank note.

The motifs 6, 7 of the embodiment of FIG. 5 can again be non-overlapping, partially overlapping or fully overlapping.

Figure 6:
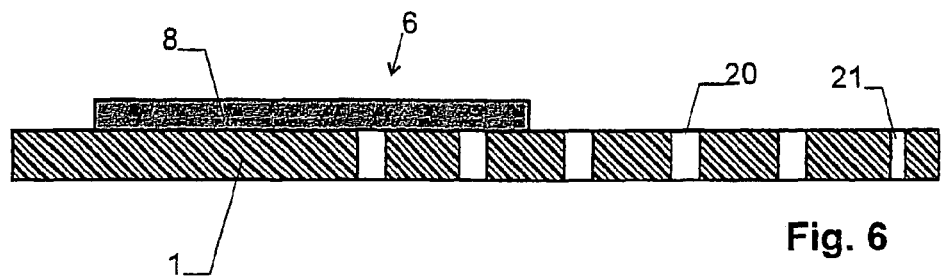
FIG. 6 is a sectional view of the volume hologram and its surroundings in a fifth embodiment of the invention.
Figure 7:
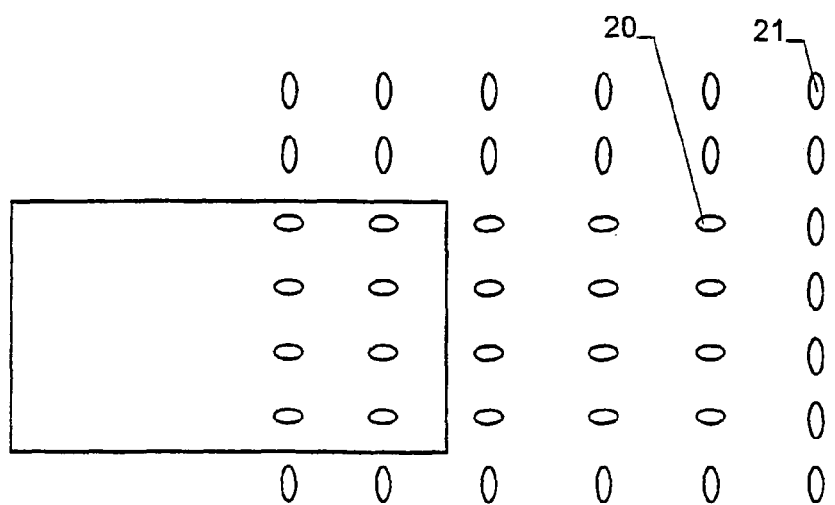
FIG. 7 is a top view of the embodiment of FIG. 6.

Another advantageous embodiment is shown in FIGS. 6 and 7. Here, the second motif 7 is formed by holes 20, 21 extending through substrate 1, which have a diameter comparable to or smaller than the thickness of the substrate. In the embodiment shown, the holes 6 and 7 are elongate, such that they form different patterns depending on the viewing angle, as it is described by WO 04/011274. For strong effects on typical paper substrates, a maximum diameter of the holes should advantageously not exceed 150 µm.

Advantageously, the holes 20, 21 are shaped to exhibit the second motif 7 only when viewed under an oblique angle, and the viewing condition for volume hologram 3 is such that the first motif 6 is also visible under such the same oblique angle, which gives a user a very strong indication of the validity of a document.

In general, the holes 20, 21 are advantageously shaped and positioned to exhibit the second motif 7 only under a given viewing angle range, over at least part of which viewing angle range the first motif 6 is visible as well.

As is shown in FIG. 7, volume hologram 8 may cover at least some of the holes 20, 21. The volume hologram may be such that it scatters light passing through the holes 20, 21. When the user is viewing the light passing through the holes 20, 21, he will then be able to see diffraction effects, such as a unique coloring or light emitting under specific angles, which further enhances the security of the document.

Figure 8:
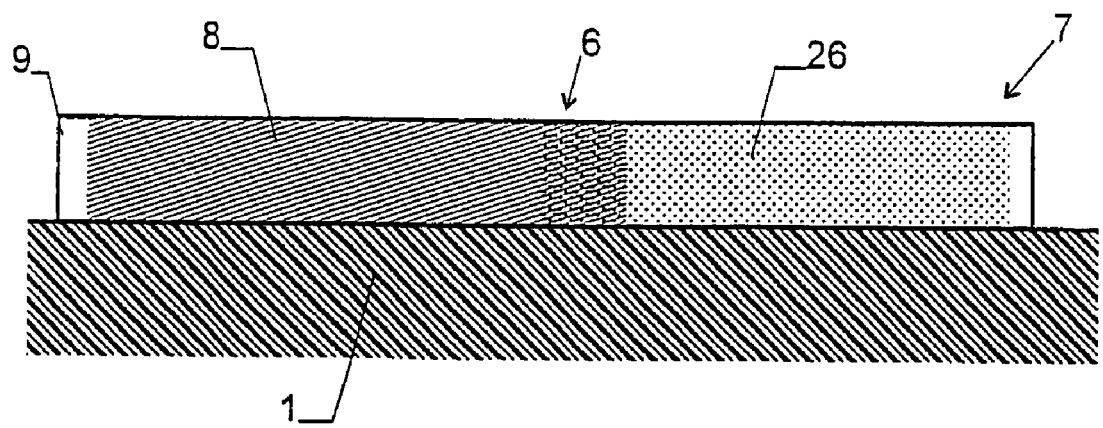
FIG. 8 is a sectional view of the volume hologram and its surroundings in a sixth embodiment of the invention.

Yet a further advantageous embodiment is shown in FIG. 8, where the matrix 9 holding the volume hologram 8 has been locally dyed, as indicated by the dotted pattern 26. This embodiment is similar to the embodiment of FIG. 2, but the dye 26 has now been suspended in the matrix 9. Similarly, the dye 26 can be applied to a surface of the matrix 9. This design has the advantage that the first and second motifs 6, 7 can both be prepared separately from substrate 1 on matrix 9.

Figure 9:
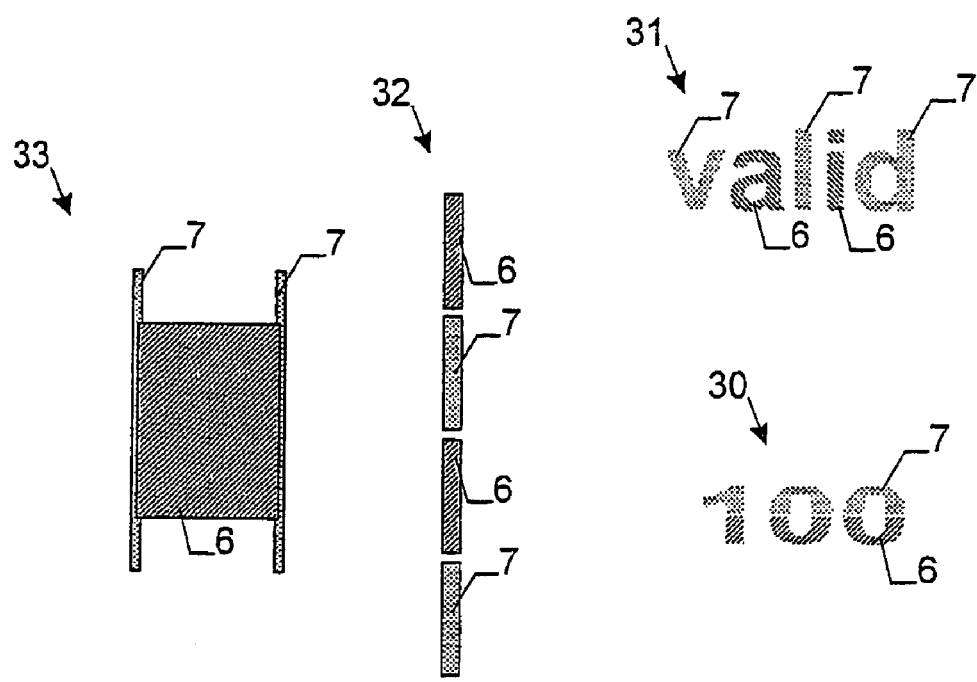
FIG. 9 shows various embodiments of possible first and second motifs.

In the embodiments shown so far, the first and the second motif 6, 7 each represent the lower or upper half, respectively, of the legible text '100'. FIG. 9 shows again such a combined motif 30, together with examples for further possible combined motifs 31-33.

In combined motif 31, the first and second motifs 6, 7 again combine to form legible text, namely the text "valid". The first motif 6 forms the even characters, while the second motif 7 forms the odd characters of the text.

In combined motif 32, the first and second motifs each form line segments, both type of lire segments being arranged collinearly to form a substantially continuous line when viewed under the viewing condition.

In combined motif 33, the first motif 6 forms a square while the second motif 7 forms two lines aligned to the edges of the square.

All these examples illustrate how the first and second motifs 6, 7 combine to a third motif that can be recognized easily.

As mentioned above, the present invention can be used as a security feature on a wide range of objects, such as banknotes, checks or other documents of value, or on passport, credit cards, id cards, but also on quality office paper or any other object where counterfeiting is to be made difficult.

While there are shown and described presently preferred embodiments of the invention, it is to be distinctly understood that the invention is not limited thereto but may be otherwise variously embodied and practiced within the scope of the following claims.

The invention claimed is:

1. An anti counterfeit security object, comprising:
   a substrate,
   a volume hologram arranged on or in the substrate,
   a first motif stored in said volume hologram and visible under a given viewing condition only, and
   a second motif stored outside said volume hologram and arranged in alignment with said first motif,
   wherein, under said viewing condition, said first and said second motifs combine to a third motif,
   wherein said second motif is at least partially formed by holes extending through said substrate,
   wherein said volume hologram covers at least some of said holes, and
   wherein said holes have a diameter of less than 150 µm.

2. The object of claim 1, wherein at least part of said holes are elongate.

3. The object of claim 1, wherein said volume hologram scatters light passing through said holes.

4. An anti counterfeit security object, comprising:
   a substrate,
   a volume hologram arranged on or in the substrate,
   a first motif stored in said volume hologram and visible under a given viewing condition only, and
   a second motif stored outside said volume hologram and arranged in alignment with said first motif,
   wherein, under said viewing condition, said first and said second motifs combine to a third motif,
   wherein said second motif is at least partially formed by holes extending through said substrate,
   wherein said volume hologram covers at least some of said holes
   wherein at least part of said holes are elongate, and
   wherein the holes are shaped and positioned to exhibit the second motif only under a given viewing angle range, over at least part of which viewing angle range the first motif is visible as well.

* * * * *